US008356577B2

(12) United States Patent
Van Den Berg

(10) Patent No.: US 8,356,577 B2
(45) Date of Patent: Jan. 22, 2013

(54) COMBINATION OF A TEAT CUP AND A FLEXIBLE MILK TUBE, A COUPLING PIECE, AND A METHOD OF MONITORING THE INTEGRITY OF THE FLEXIBLE MILK TUBE

(75) Inventor: Karel Van Den Berg, Bleskensgraaf (NL)

(73) Assignee: Maasland N.V., Maassluis (NL)

( * ) Notice: Subject to any disclaimer, the term of this patent is extended or adjusted under 35 U.S.C. 154(b) by 0 days.

(21) Appl. No.: 12/891,880

(22) Filed: Sep. 28, 2010

(65) Prior Publication Data

US 2011/0011344 A1   Jan. 20, 2011

Related U.S. Application Data

(63) Continuation of application No. 11/819,249, filed on Jun. 26, 2007, now Pat. No. 7,827,933.

(30) Foreign Application Priority Data

Jun. 27, 2006   (NL) ...................................... 1032063

(51) Int. Cl.
*A01J 5/00* (2006.01)
*A01J 5/04* (2006.01)

(52) U.S. Cl. ................ 119/14.54; 119/14.01; 119/14.14; 119/14.18; 119/14.31; 119/14.37; 119/14.38; 119/14.47; 119/14.48; 119/14.49; 119/14.5; 119/14.51; 119/14.52; 119/14.53; 119/14.55; 141/54; 141/285; 141/290; 138/115; 138/116

(58) Field of Classification Search ............... 119/14.01, 119/14.14, 14.18, 14.31, 14.37, 14.38, 14.47–14.55; 141/54, 285, 290; 138/115–116; *A01J 5/00, A01J 5/04*

See application file for complete search history.

(56) References Cited

U.S. PATENT DOCUMENTS 1,093,766 A * 4/1914 Robinson ...................... 138/156
(Continued)

FOREIGN PATENT DOCUMENTS

DE    3931769 A1    4/1991
(Continued)

OTHER PUBLICATIONS

VMS Service News Delaval Publication From 2001.
(Continued)

*Primary Examiner* — Kimberly Smith
*Assistant Examiner* — Michael Wang
(74) *Attorney, Agent, or Firm* — David P. Owen; Coraline J. Haitjema; Hoyng Monegier LLP

(57) ABSTRACT

A combination of a teat cup and a flexible milk tube is shown. The flexible milk tube has a main duct and a plurality of secondary ducts for discharging milk from the teat cup and for applying vacuum in the teat cup. The main duct is confined by a duct wall extending around the main duct. The secondary ducts are included in the duct wall of the main duct. By including the plurality of secondary ducts in the duct wall of the main duct the flexible milk tube as a whole has a smaller cross-section than that of the known milk tube. The plurality of secondary ducts no longer need separate duct walls forming separate tubes either connected or not with the flexible milk tube comprising the main duct. This results in space saving.

15 Claims, 2 Drawing Sheets

U.S. PATENT DOCUMENTS

| | | | |
|---|---|---|---|
| 1,216,726 A | | 2/1917 | Jensen Pirups-Hvarre |
| 1,365,665 A | | 1/1921 | Davies |
| 1,930,285 A | * | 10/1933 | Robinson .................... 138/143 |
| 2,376,717 A | | 5/1945 | Omdalen |
| 2,408,390 A | * | 10/1946 | Gessler .................... 119/14.49 |
| 2,425,873 A | | 8/1947 | Gessler |
| 3,503,634 A | | 3/1970 | Cadiou |
| 3,845,743 A | | 11/1974 | Van Staveren |
| 4,273,070 A | | 6/1981 | Hoefelmayr |
| 4,585,034 A | * | 4/1986 | Hubbard et al. ............. 138/111 |
| 4,637,639 A | | 1/1987 | Jorgensen et al. |
| 4,732,414 A | | 3/1988 | Inaba |
| 4,941,433 A | | 7/1990 | Hanauer |
| 5,135,265 A | | 8/1992 | Bouscher et al. |
| 5,501,840 A | * | 3/1996 | Mantovani et al. ............ 494/18 |
| 5,860,388 A | | 1/1999 | Tan et al. |
| 6,755,153 B1 | * | 6/2004 | Chowdhury ................ 119/14.47 |
| 6,935,270 B2 | | 8/2005 | Wipperfurth et al. |
| 6,997,136 B1 | | 2/2006 | Coates |
| 2004/0094096 A1 | * | 5/2004 | Fransen et al. ............. 119/14.43 |
| 2005/0000455 A1 | | 1/2005 | Havermans et al. |
| 2009/0223455 A1 | * | 9/2009 | Petterson et al. .......... 119/14.51 |

FOREIGN PATENT DOCUMENTS

| | | |
|---|---|---|
| DE | 19636273 A1 | 12/1998 |
| DE | 10114706 A1 | 10/2002 |
| DK | 9400044 U3 | 3/1994 |
| EP | 1872653 B1 | 1/2008 |
| FR | 773584 A | 11/1934 |
| FR | 2522388 A1 | 9/1983 |
| FR | 2703755 A1 | 10/1994 |
| GB | 215189 A | 5/1924 |
| GB | 318244 A | 5/1930 |
| GB | 809112 A | 2/1959 |
| GB | 923816 A | 1/1963 |
| GB | 940412 A1 | 10/1963 |
| GB | 967358 A1 | 8/1964 |
| GB | 2030838 A | 4/1980 |
| GB | 2119465 A | 11/1983 |
| GB | 2151894 A | 11/1984 |
| GB | 2290848 A * | 1/1996 |
| SU | 1117024 A | 4/1983 |
| WO | 2004034774 A2 | 4/2004 |

OTHER PUBLICATIONS

Collins English Dictionary, 3rd Edition 1991, p. 519.
European Search Report EP 07 07 5417, Sep. 19, 2010.
Dutch Search Report and GB translation thereof.
Definition of Distribute from the Free Merriam-Webster Dictionary, 2011, Merriam-Webster, Incorporated.
Response from Maasland N.V. Van to Notice of Opposition, dated Jan. 11, 2011.
Notice of Opposition [of EP counterpart patent No. EPB1872653] DeLaval International AB, dated May 28, 2010.

* cited by examiner

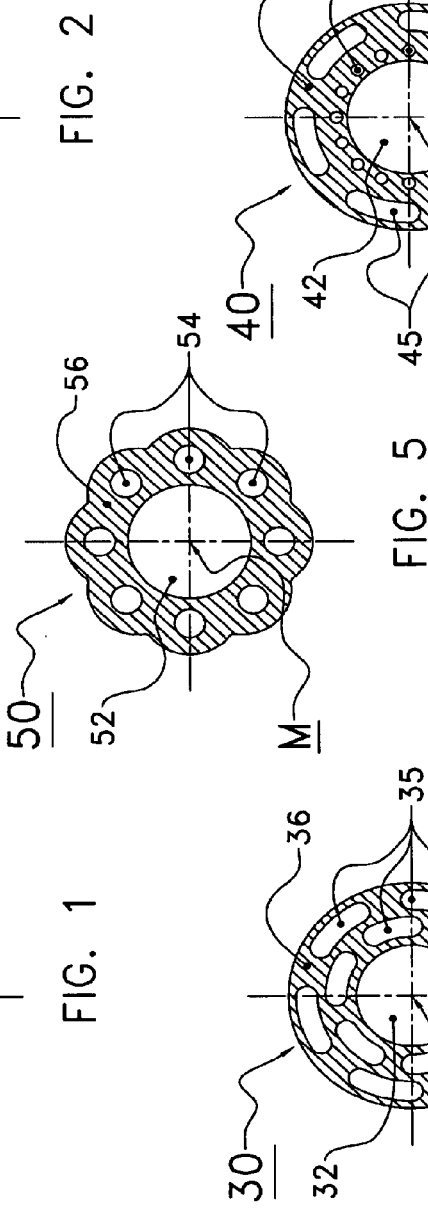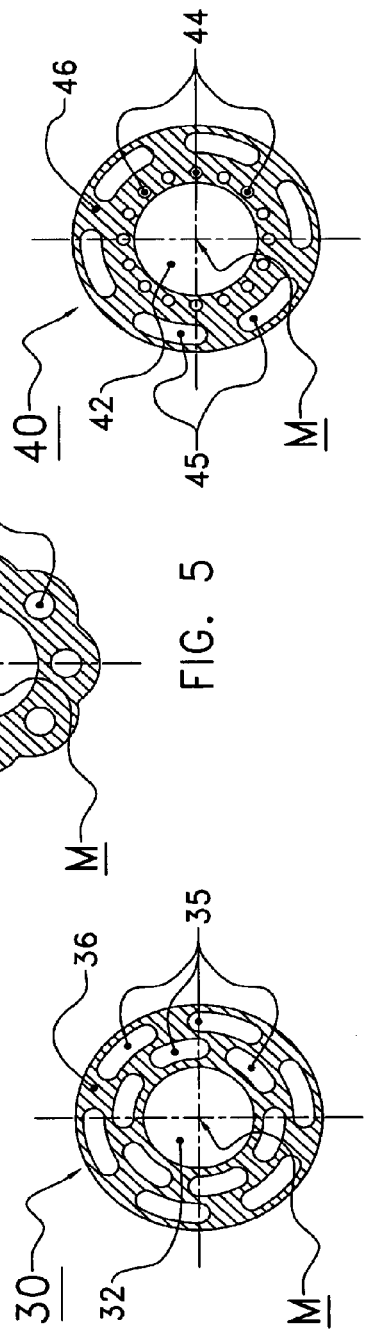

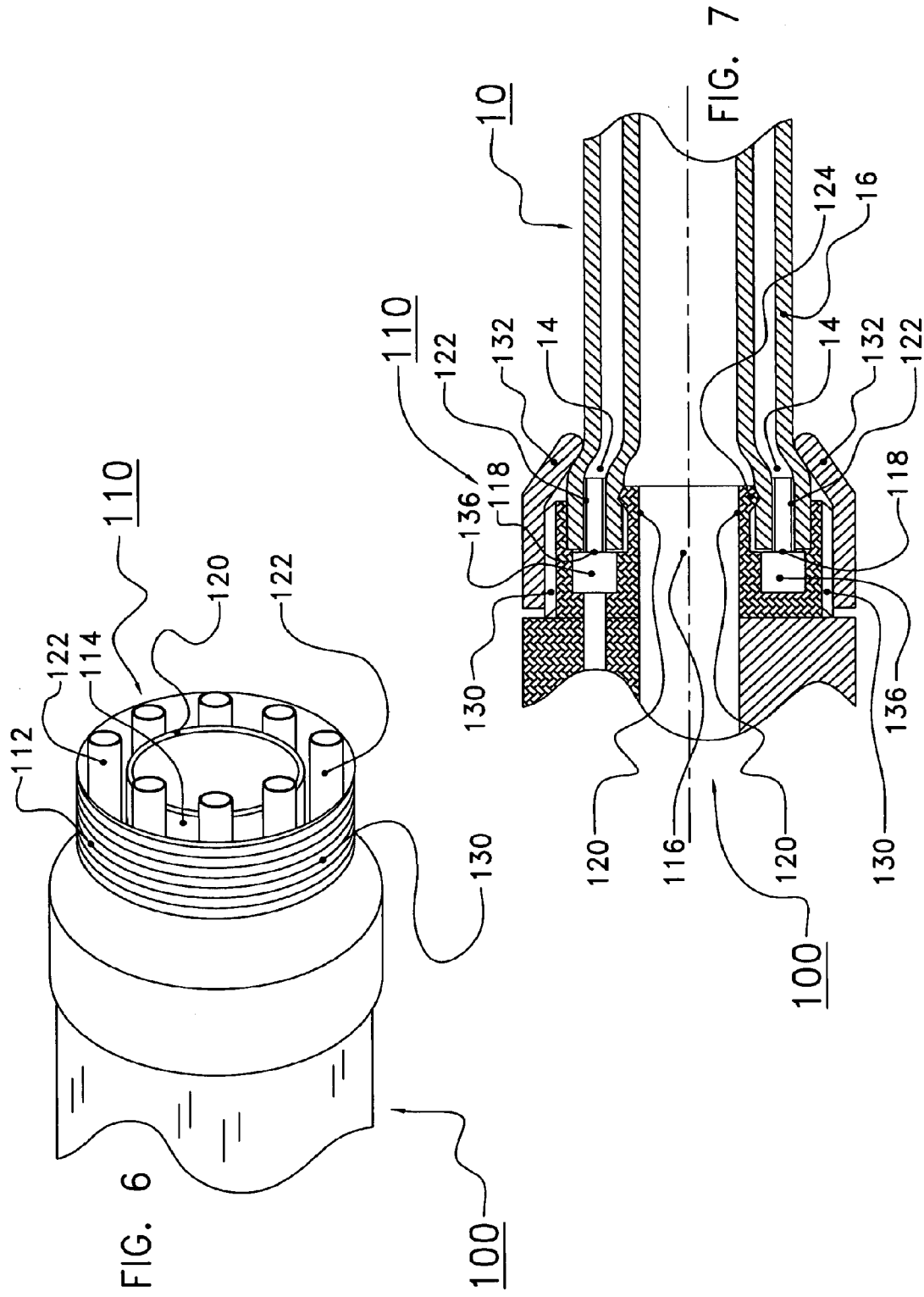

US 8,356,577 B2

COMBINATION OF A TEAT CUP AND A FLEXIBLE MILK TUBE, A COUPLING PIECE, AND A METHOD OF MONITORING THE INTEGRITY OF THE FLEXIBLE MILK TUBE

CROSS REFERENCE TO RELATED APPLICATIONS

This application is a continuation of U.S. non provisional application Ser. No. 11/819,249 filed Jun. 26, 2007, which claims priority from Dutch patent application 1032063 filed on 27 Jun. 2006, the contents of both applications are hereby incorporated by reference in their entirety.

BACKGROUND OF THE INVENTION

1. Field of the Invention

The invention relates to the field of milking dairy animals and more particularly to a combination of a teat cup and a flexible milk tube having multiple ducts. The invention also relates to a method of monitoring the integrity of such a milk tube and to a coupling piece for connecting of the milk tube to a further component.

2. Description of the Related Art

Devices are known for automatically milking a dairy animal, such as a cow, in which a teat cup is connected to a flexible milk tube. The milk tube may serve for discharging milk obtained by milking, applying vacuum to an end of a teat of the cow, applying a pulsating vacuum to the circumferential surface of the teat of the cow, and for supplying clean air to the teat cup. For these functions, the relevant flexible milk tube may be provided with a plurality of ducts. Such a device is known from WO-96/17509, the content of which is incorporated herein by reference, which discloses a case with three ducts. These three ducts are separated from each other. This means that the ducts are capable of fulfilling different functions. A main duct substantially applies continuous vacuum and discharges the milk, a first secondary duct applies the pulsating vacuum, and a second secondary duct supplies the air. Each of the main and secondary ducts is confined by its own duct wall. In fact, there are thus formed three separate tubes that are interconnected over a substantial part of their length.

The known flexible milk tubes have certain disadvantages, including the fact that they may occupy a relatively large amount of space. This may be of particular relevance in cases where each teat cup is separately connected to the milking device and vacuum source. In such cases, a plurality of milk tubes from each of the four udder quarters of an animal may run together over a considerable distance e.g. along a part of the robot arm of an automatic milking robot. Another disadvantage of a plurality of separate tubes is that they can easily tangle and snag. In cases where the tubes are physically connected together, the resulting tube bundle is generally non symmetrical and may always tend to bend in one direction. In certain circumstances, this may be undesirable.

BRIEF SUMMARY OF THE INVENTION

The present invention aims at providing a combination of a teat cup and a flexible milk tube, that offers an alternative to prior art arrangements or in which the above-mentioned drawback is at least partially obviated. The invention aims in particular at providing a combination of a teat cup and a flexible milk tube, in which the flexible milk tube occupies less space than the flexible milk tube as disclosed in WO-96/17509.

According to one aspect, the invention relates to a combination of a teat cup and a flexible milk tube. The flexible milk tube comprises a main duct and a plurality of secondary ducts for discharging milk from the teat cup and for applying vacuum in the teat cup. The secondary ducts are separated from the main duct. The main and secondary ducts extend substantially in an axial direction of the flexible milk tube. The main duct is confined by a duct wall extending around the main duct. The secondary ducts are incorporated into the duct wall of the main duct.

By including the plurality of secondary ducts in the duct wall of the main duct the flexible milk tube as a whole may have a smaller cross-section than that of the known milk tube. In this situation, the plurality of secondary ducts no longer need separate duct walls, which duct walls form separate tubes that are either connected or not with the flexible milk tube comprising the main duct. This results in space saving. It is also understood that as a consequence of this construction, the secondary ducts may not generally be separated from the main duct without damaging the integrity of that main duct, since both share a common wall.

As it is common practice to design a duct wall of a main duct of a flexible milk tube as a relatively thick wall, a flexible milk tube having the same cross-section as a commonly used flexible milk tube comprising only a main duct will even often suffice. Even if a somewhat greater thickness of the duct wall is chosen in order to create additional space for including the secondary ducts, the tube according to the invention will occupy in general less space than in the case of the secondary ducts being provided with their own duct walls, such as in the state of the art.

In particular, the secondary ducts are equally distributed around the circumference of the duct wall. This results in a flexible milk tube having a substantially comparable flexibility in all different directions.

In one embodiment, the flexible milk tube is provided with at least five, in particular six, more in particular eight, secondary ducts. According to the extent to which the number of secondary ducts is larger, the needed flow-through area of the collective secondary ducts is distributed over a larger number of secondary ducts, and it will be possible for the individual secondary ducts to be designed smaller. An upper limit to the desired number of secondary ducts is determined by the increase of the flow-through resistance at the decrease of the cross-section of the secondary ducts and by practical considerations with respect to the manufacture of the flexible milk tube. Furthermore, there is a relation between the cross-section and the number of secondary ducts. There has to be enough wall material left between the secondary ducts to prevent the flexible milk tube from cracking and distorting.

In a favourable embodiment, the secondary ducts, seen from an imaginary centre line of the main duct, are laterally offset relative to each other in a radial direction and overlap each other at least partially in circumferential direction. This means that possible damage of the duct wall of the flexible tube will in general first bring one of the secondary ducts into connection with the surroundings of the flexible milk tube. This reduces the risk of the main duct, which is in general used for discharging the milk, being contaminated from its surroundings.

Preferably, the main duct and the secondary ducts are generally elliptical in shape. In the present context, elliptical is understood to include the particular case of circular. In particular the secondary ducts may also be elongated in cross-section, preferably in the circumferential direction of the tube. Most preferably, the duct wall outer surface also has an elliptical shape, in particular round. Preferably this surface is also smooth to reduce the possible attachment of contamination.

The invention also relates to a coupling piece for bringing a flexible milk tube into a coupled position with a component of a milking installation, such as a teat cup. The coupling piece is provided with a coupling surface with a main aperture and a plurality of secondary apertures that are intended to be brought into a flow-through connection with a main duct, and a plurality of secondary ducts, respectively, of the flexible milk tube. The secondary apertures are distributed around the entire circumference of the main aperture. There is thus obtained a compact, space saving coupling for a flexible milk tube with a plurality of ducts.

In one embodiment, the coupling piece is further provided with secondary pipes and a clamping ring. The secondary pipes are adapted to be included, in the coupled position, in the secondary ducts, near a proximal end of the flexible milk tube, i.e. the end of the flexible milk tube that faces the relevant coupling piece in the coupled position. The clamping ring extends, in the coupled position, around the projecting pipes. The secondary pipes in the secondary ducts give the flexible milk tube a greater rigidity at the place of the coupling piece than in the case of a flexible milk tube according to the state of the art. This means that the clamping ring is capable of exerting sufficient clamping force on the flexible milk tube to reduce the risk of the flexible milk tube coming loose from the coupling piece.

The invention further relates to a method of monitoring the integrity of a flexible milk tube, which flexible milk tube comprises a main duct and a plurality of secondary ducts for discharging milk from the teat cup and for applying vacuum in the teat cup. The method comprises applying a pressure on at least a first group of the plurality of secondary ducts, which pressure deviates from an ambient pressure, determining the pressure in the first group of the plurality of secondary ducts, determining a control pressure value defined as the difference between the measured pressure and a reference pressure, comparing the control pressure value with a predetermined desired pressure value, or a development in time of the control pressure value with a predetermined desired development in time of a pressure value, and supplying an alarm signal if the control pressure value, or the development in time of the control pressure value, deviates to a predetermined extent from the predetermined desired pressure value, or the predetermined desired development in time of the pressure value.

The method according to the invention thus provides information about the flexible milk tube becoming leaky before—generally speaking—the main duct that discharges milk is damaged itself and will possibly be brought into connection with the surroundings. This is particularly important in the context of automatic milking devices that may be subjected to prolonged and intensive use without the presence of an operator to monitor the condition of the tube. Furthermore, since damage to the milk tube could be internal, this would not always be observable by external inspection.

In particular, the supply of the alarm signal leads to the conveyance of milk from the flexible milk tube being stopped. This prevents possibly contaminated milk from being conveyed.

In a favourable embodiment, a pressure is also measured in a second group of the plurality of secondary ducts, or in the main duct, which pressure in the second group of the plurality of secondary ducts, or in the main duct, is used as the reference pressure. By monitoring a pressure difference between different ducts of the flexible milk tube, accurate and reliable monitoring may be obtained.

According to a favourable embodiment of the invention, there is provided an automatic milking installation comprising four such assemblies of milk tube and teat cup and a robot device for automatically connecting the teat cups to the udder quarters of a dairy animal. The milk tubes may be co-extensive with at least part of a robot arm of the robot device. The reduced cross section of each tube ensures that the overall bulk of tubes carried by the arm is reduced. Alternatively, each assembly may be individually carried by the robot arm. Even in this case, the reduced cross section and the uniform flexibility may be advantageous.

BRIEF DESCRIPTION OF THE DRAWINGS

The invention will be explained in further detail with reference to the accompanying drawing showing different embodiments of the invention, in which:

FIG. 1 shows a first embodiment of a flexible milk tube;
FIG. 2 shows a second embodiment of a flexible milk tube;
FIG. 3 shows a third embodiment of a flexible milk tube;
FIG. 4 shows a fourth embodiment of a flexible milk tube;
FIG. 5 shows a fifth embodiment of a flexible milk tube;
FIG. 6 shows a teat cup with a coupling piece, and
FIG. 7 is a cross-sectional view of the teat cup of FIG. 6 in the situation in which it is coupled with a flexible milk tube.

DESCRIPTION OF ILLUSTRATIVE EMBODIMENTS

FIG. 1 shows a flexible milk tube that is indicated as a whole by the reference numeral 10. The flexible milk tube 10 comprises a main duct 12 and a plurality, eight in this case, of secondary ducts 14. A duct wall 16 extends around the main duct 12. The eight secondary ducts 14 are included in the duct wall 16. The main duct 12 is intended for applying a vacuum in a teat cup (see FIGS. 6 and 7) and for discharging milk from a teat of an udder of a non-shown dairy animal. A first group of secondary ducts 14, or all secondary ducts 14, are intended for applying, in a manner known per se, a pulsating vacuum in a part of the teat cup. A second group of secondary ducts 14 may possibly be intended for supplying clean air to the teat cup.

The duct wall 16 of the flexible milk tube 10 has a thickness that is usual for preventing the flexible milk tube 10 from cracking and/or preventing the flexible milk tube 10 from getting closed or defect by kicking by the dairy animal By disposing, according to the invention, the secondary ducts in said duct wall 16, it is not necessary to provide a separate tube for the pulsating vacuum and/or for supplying clean air. Surprisingly, disposing the secondary ducts 14 in the duct wall 16 does not have an adverse effect on the cracking resistance of the flexible milk tube 10. In other words the flexible milk tube 10 according to the invention has a cracking resistance that is comparable with, or is surprisingly even better than that of a flexible milk tube with the same wall thickness but without secondary ducts being included in the duct wall.

Furthermore, the flexible milk tube 10 according to the invention is more flexible than a flexible milk tube that is not provided with secondary ducts in the duct wall. This facilitates handling of the flexible milk tube 10 in practice. Moreover, the flexible milk tube 10 needs less material than in the case of separate tubes (either interconnected or not) being used for discharging milk and applying a pulsating vacuum.

The eight secondary ducts 14 are distributed over the entire circumference of the duct wall 16. In this case, the angular distance of the secondary ducts 14 relative to each other is always substantially 45 degrees. More in general, the flexible milk tube 10 may be divided imaginarily into four quarter circles, at least one secondary duct 14 being present in each quarter-circle-shaped cross-section. A regular division of four, five, six, seven, eight, or more secondary ducts 14 around the circumference of the duct wall provides substantially homogenous characteristics of the flexible milk tube 10, the flexibility, for example, being comparable in all directions. Preference is given to the shown number of eight secondary ducts 14. From a point of view of robustness it is advantageous if the secondary ducts 14 are located closer to the inner side than to the outer side of the duct wall 16. In other words, the secondary ducts 14 are located closer to the main duct 12 than to the surroundings outside the flexible milk tube 10.

The main duct 12 has a relatively large cross-section, and consequently a relatively large cross-sectional area that is available as flow-through area, relative to each of the individual secondary ducts 14. However, the secondary ducts 14 provide collectively a flow-through area that is sufficient for applying a pulsating vacuum. However, the flow-through area needed for this purpose is in general smaller than that of the flow-through area for discharging milk.

The flexible milk tube 10 has a smooth exterior wall. Although, within the scope of the invention, it is conceivable per se that the exterior wall is provided with protrusions, or corrugations, a smooth exterior wall is extra advantageous, because this reduces the risk of impurities and dirt sticking to the flexible milk tube 10.

FIG. 2 is a cross-sectional view of a variant of a flexible milk tube 20 according to the invention. The flexible milk tube 20 comprises a main duct 22, secondary ducts 25, and a duct wall 26. This embodiment differs from that of FIG. 1 in that the secondary ducts 25 have an elongated shape, which elongated shape extends in the direction of the duct wall. This means that a smaller number of secondary ducts 25, in this case six, will suffice, whereas there is achieved nevertheless a total flow-through area that is comparable with that of FIG. 1. The elongated shape is further advantageous upon detecting damage to the flexible milk tube 20, as will be set out in further detail hereinafter.

FIG. 3 shows a flexible milk tube 30 with a main duct 32 and twelve secondary ducts 35 that are included in a duct wall 36. An imaginary centre line M, in this case also to be considered as the imaginary centre line of the entire flexible milk tube 30, extends through the main duct 32.

The secondary ducts 35 are in a staggered position relative to each other in radial direction relative to the centre lines, the end of each of the secondary ducts 35 also overlapping an end of a next secondary duct 35. In this manner, seen from the centre line M, in each radial direction at least one secondary duct 35 is located in the duct wall 36. This means that possible damage from outside to the flexible milk tube 30 will result in almost all cases in one of the ducts 35 being brought into connection with the surroundings before (also) the main duct is brought into connection with the surroundings.

FIG. 4 shows a flexible milk tube 40 that is provided with a main duct 42. The flexible milk tube 40 further comprises a first group of secondary ducts 44 and a second group of secondary ducts 45. Both the first group 44 and the second group 45 of secondary ducts are included in a wall 46 extending around the main duct 42.

In the embodiment shown, the first group 44 of secondary ducts is located at a smaller radial distance relative to an imaginary centre line M of the main duct 42 than the second group 45 of secondary ducts. However, the inverse situation is also possible. Furthermore, the secondary ducts of both the first group 44 and the second group 45 may be circular, or elliptical, or otherwise elongated in cross-section. In use, one of the two groups of secondary ducts may be used, for example, for applying a pulsating vacuum, whereas the other group may be used for applying a pressure lower or higher than the atmospheric pressure, for detecting damage to the flexible milk tube 44, as will be described hereinafter in further detail.

FIG. 5 shows a flexible milk tube 50 with a main duct 52 and secondary ducts 54 that are included in a duct wall 56. In this case, the duct wall 56 is provided at its outer side with corrugations at the place where the secondary ducts 54 are located. This means that there is additional material provided between the secondary ducts 54 and the outer side of the duct wall 56. The secondary ducts 54 are preferably located within an imaginary outer contour of the duct wall 56 extending through the points on the outer side of the duct wall 56 having the smallest radial distance relative to the imaginary centre line M. The extent of corrugation of the flexible milk tube 50 is preferably limited in order to reduce the risk of contamination of the flexible milk tube 50. In other words, the variation in thickness of the duct wall 56 is limited, the greatest thickness being preferably no more than twice the smallest thickness of the duct wall 56.

FIG. 6 is an indicative view of part of a teat cup 100 provided with a coupling piece 110. The coupling piece 110 comprises a cylindrical body 112, one end of which is connected with the teat cup 100 and a second end of which may be considered as a coupling surface 114. The coupling surface 114 is provided with a main aperture 116 and a plurality, eight in this case, of secondary apertures 118. A main pipe 120 and secondary pipes 122 extend from the coupling surface 114. The main pipe 120 is in a flow-through connection with the main aperture 116. The secondary pipes are in a flow-through connection with the respective secondary apertures 118.

A clamping projection 124 extends around the main pipe 120 in the vicinity of a distal end of it. A casing 130 extends around the cylindrical body. Said casing 130 extends, seen in axial direction, to beyond the coupling surface 114. The casing 130 is provided with external screw thread that is capable of cooperating with internal screw thread of a clamping ring 132 (FIG. 7).

The secondary apertures 118 are all in a flow-through connection with a first connecting area 136. In this embodiment, the first connecting area 136 is a ring-shaped area constituted by a recess in the cylindrical body 112.

FIG. 7 shows (part of) the teat cup 100 with coupling piece 110 in a coupled position with the flexible milk tube 10 of FIG. 1. By means of a corresponding adaptation of the secondary pipes, as shown in FIG. 6, the person skilled in the art is capable of making the coupling piece of FIG. 6 suitable for one of the other shown or non-shown flexible milk tubes.

In use, a flexible milk tube 10 will be disposed on the coupling piece 110 and the main duct 12 will be shifted on to the main pipe 120, over the clamping projection 124, so that the main duct 12 will come into a flow-through connection with the main aperture 116. Moreover, the secondary ducts 14 will be shifted on to the secondary pipes 122, for forming a flow-through connection of the secondary ducts to the secondary apertures 118. An axial end of the flexible milk tube 10 is then preferably disposed against the coupling surface 114.

After the flexible milk tube has been disposed, the clamping ring 132 is screwed to the casing 130. Although such a measure is commonly used for single, thin-walled tubes, this has in general not appeared suitable for flexible milk tubes. Known flexible milk tubes often have on their outer sides a non-round cross-section, which makes them less suitable for applying a clamping ring. Besides, flexible milk tubes have in general a great wall thickness. This results in that a possible clamping ring, in the case of the known flexible milk tubes, leads mostly to the duct wall being pushed in, without resulting in a sufficiently clamping effect. Due to the inventive coupling piece, and the inventive flexible milk tube, these drawbacks are obviated. Thanks to the invention, the flexible milk tube with a plurality of ducts may have, if desired, a round outer circumference. Besides, the secondary pipes 122 ensure that the duct wall 16 becomes rigid. Due to this rigidity, the clamping ring 132 has sufficient grip to achieve a substantial clamping. The clamping projection 124 further increases the clamping effect of the clamping ring 132 on the flexible milk tube 10.

In practice, each of the flexible milk tubes shown, as well as the coupling piece shown, is capable of being used for discharging milk from the teat cup 100, applying a vacuum in the teat cup 100, applying a pulsating vacuum in the teat cup 100, as well as for supplying clean air to the teat cup 100. For this purpose, the other (non-shown) end of the flexible milk tube 10 may also be provided with a coupling piece, comparable with coupling piece 110, for coupling to a not further shown milking installation. Of course, coupling is also possible in another way, or by means of another type of coupling. A connecting area, or a second connecting area, may also be located in the relevant coupling piece. Also in the case of no coupling piece being provided at the second end of the flexible milk tube 10, a second connecting area will be located elsewhere in the milking installation. The milking installation may comprise a robot arm (not shown) for connecting the teat cups. Example of such milking installations are shown in U.S. application Ser. No. 11/643,715 filed 22 Dec. 2006 and U.S. Pat. No. 7,044,079, the contents of both of which are hereby incorporated entirely by reference.

The first connecting area 136 and the non-shown second connecting area are each intended for interconnecting a group of the secondary ducts 14, in this case all secondary ducts 14, in a flow-through connection, at the respective ends of the flexible milk tube 10. This means that the secondary ducts collectively form an imaginary duct for fulfilling a function, such as collectively applying a pulsating vacuum in the teat cup 100. The secondary ducts 14 may thus be considered as one virtual secondary duct that is divided into a plurality of physical secondary ducts. Of course, not all secondary ducts have to be interconnected by the first and the second connecting area. There may even be provided a third, a fourth, or even more connecting areas, so that there are formed, as it were, groups of secondary ducts, it being possible for each group to fulfil its own function. This means that, besides for applying a pulsating vacuum, as described in the foregoing, it is also possible to use the secondary ducts for supplying clean air, or for other functions.

Besides, it will be possible to use one of the secondary ducts or, if desired, a non-shown additional secondary duct, as a conveying duct for an electric cable, for example for supplying electricity, or for transferring a measuring signal. Of course, one secondary duct may also be provided with a plurality of electric cables, or a plurality of secondary ducts may be provided, if desired, with such electric cables.

In a favourable embodiment of one of the flexible milk tubes, or of a non-shown flexible milk tube with a main duct and a plurality of secondary ducts, the integrity of the relevant flexible milk tube is monitored. Within the scope of the method there is applied a pressure to the secondary ducts, or to a group of secondary ducts. This may be a higher pressure, or a lower pressure, relative to the pressure in the surroundings of the milk tube. If the relevant flexible milk tube is now damaged, in general first of all one of the secondary ducts will be brought into connection with the surroundings. In order to increase the chance of this taking place, the secondary ducts with elongated cross-sectional shapes, in particular the secondary ducts that overlap each other, offer an additional advantage because they increase the chance that a secondary duct will be brought first, i.e. before the main duct, into connection with the surroundings.

As soon as a secondary duct is brought into connection with the surroundings, different things may occur. In the first place, in the case of higher pressure, air, or another gas, will blow environmental dirt from the secondary duct that has become leaky. The risk of contamination of milk in the main duct is thus reduced. Also in the case of lower pressure in the duct that has become leaky, the risk of contamination is reduced owing to the fact that it is possible for dirt, if any, to be exhausted via the relevant secondary duct.

A second effect when a secondary duct becomes leaky is that the pressure in this secondary duct will deviate relative to a predetermined pressure. It is possible to determine this pressure, for example by measurement. It is possible to deduce a control pressure value from the measured pressure by determining the difference between the measured pressure and a reference pressure. The reference pressure may simply be zero, or may have another constant value. However, the reference pressure may also be a measured pressure itself, for example a pressure in another group of the secondary ducts, or in the main duct. The control pressure value thus determined is compared with a predetermined desired pressure value. If the control pressure value deviates to a predetermined extent from the predetermined desired pressure value, this is an indication of leakage. Such a deviation may be observed and converted into an alarm signal by a (non-shown) control unit. Such an alarm signal may simply be a light signal and/or a sound signal. However, it is also possible to send, via a wire connection or a wireless connection, a signal to a user located remote from the relevant milk tube, for example at a farm or a central service centre. It is also possible to use the alarm signal in an advantageous manner as a signal for removing the vacuum in the main duct and/or for ensuring in another manner that milk coming, via the main duct, from the damaged flexible milk tube of the relevant teat cup will no longer be supplied to a point where it is collected with other (good) milk and discharged further. Instead, the milk discharge by the relevant flexible milk tube is stopped, or the milk in question is conveyed to a waste line.

In the above-described method it is also advantageous to make use of the varying pressure in that part of the secondary ducts that is used for applying a pulsating vacuum. In that case, the development in time of the relevant pulsating pressure is compared with a predetermined development in time for this pulsating pressure. If the relevant pulsating pressure levels, i.e. if it takes longer to increase and/or decrease the pressure than in the case of an undamaged flexible milk tube, this is an indication of leakage of the flexible milk tube. Apart from that, the above-described method steps may be followed.

Within the scope of the invention, various variants to the embodiments shown and described are possible. For example, the main ducts and secondary ducts do not have to be circular, but may also be elliptically shaped. In other words, main ducts and secondary ducts have a cross-sectional shape that corresponds to a continuous conic section. More in general, the main ducts and secondary ducts have cross-sectional shapes with a flowing contour without acute angles. This facilitates cleaning of the main and secondary ducts and thus improves hygiene for use as a milk tube.

In the embodiments shown, the flexible milk tubes have a substantially round outer circumference. This also contributes to the relevant flexible milk tubes having in several directions a substantially equal flexibility and this also improves for other reasons the ease of handling of the relevant flexible milk tubes. However, within the scope of the invention, an elliptically shaped outer circumference is also imaginable. Said circumference still offers, for example, the advantage of reduced space occupation relative to flexible milk tubes according to the state of the art. An elliptically or otherwise shaped outer circumference with a flowing contour has the advantage that dirt less easily sticks to the exterior wall of the relevant flexible milk tube than in the case of the outer circumference being provided with acute angles, corrugations, or other protrusions.

In the embodiments shown, the duct walls of the main ducts have a constant thickness. Although such a constant thickness is advantageous from a point of view of material usage and space occupation, a varying thickness is also possible within the scope of the invention. However, from a point of view of homogeneity of the characteristics and space occupation, it is advantageous to limit such a variation to, for example, a relation of 1:2 between the smallest and the largest wall thickness, respectively.

It is also possible to provide the pipes of the coupling piece shown entirely or partially loosely from the coupling piece. There may be provided, for example, a set of secondary pipes that are loosely inserted into a flexible milk tube and thus function especially for making the flexible milk tube rigid for the purpose of coupling. In a variant, at least a part of the loose secondary pipes are interconnected, for example via an annular connecting element. It is advantageous if one part of the secondary pipes is provided fixedly to the coupling piece and a second part of the secondary pipes is provided loosely from the coupling piece. The fixed secondary pipes are then intended, for example, for the secondary ducts supplying clean air, whereas the loose secondary pipes are intended for secondary ducts applying pulsating vacuum. By connecting one part of the secondary pipes fixedly and another part non-fixedly with the coupling piece, there may be formed a codification as a result of which there will only be one way of coupling the coupling piece to the flexible milk tube.

The invention thus provides a combination of a teat cup and a flexible milk tube with a large number of advantages. The flexible milk tube has a plurality of ducts that may be used for different functions in a milking installation. Despite the presence of a plurality of ducts, by including a plurality of secondary ducts in a duct wall, the flexible milk tube needs not to occupy more space than an already known flexible milk tube. Furthermore, for the inventive flexible milk tube less material is needed than for the commonly used flexible milk tubes with a plurality of ducts. The inventive flexible milk tube has a good cracking resistance and is at the same more flexible than known flexible milk tubes.

Moreover, the flexible milk tube is very suitable for an inventive coupling piece. The inventive coupling piece needs less space for coupling to, for example, a teat cup than commonly used couplings between flexible milk tubes and teat cups. Moreover, the inventive coupling piece provides a more secure connection than the commonly used couplings.

In a method according to the invention, in which a flexible tube according to the invention is preferably used, it is possible to detect that the flexible tube becomes leaky, to prevent milk from being contaminated and to prevent possibly contaminated milk from being supplied to clean milk.

Thus, the invention has been described by reference to certain embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention.

What is claimed is:

1. A teat cup device comprising a teat cup and a flexible milk tube, the flexible milk tube being connected to the teat cup for discharging milk from the teat cup and applying a vacuum in the teat cup, the flexible milk tube comprising:
   a main duct defined by a duct wall,
   a plurality of secondary ducts located within the duct wall of the main duct, wherein the secondary ducts are separated from the main duct by the duct wall and the plurality of secondary ducts being distributed over an entire circumference of the duct wall, and
   wherein the main and secondary ducts extend in the axial direction for substantially the entire length of the flexible milk tube; and
   wherein the secondary ducts being laterally offset relative to each other in a radial direction with respect to the main duct and overlapping each other at least partially in a circumferential direction.

2. The teat cup device according to claim 1, the flexible milk tube being provided with at least five secondary ducts.

3. The teat cup device according to claim 1, which combination is further provided with a first connecting area and a second connecting area, which are located in the vicinity of a first end and a second end, respectively, of the flexible milk tube, each being in flow-through connection with at least one group of the plurality of secondary ducts, for forming a collective duct.

4. The teat cup device according to claim 1, the main duct having a cross-sectional area that is larger than the collective cross-sectional area of two of the secondary ducts.

5. The teat cup device according to claim 4, the main duct having a cross-sectional area that is at least equal to the collective cross-sectional area of all secondary ducts.

6. The teat cup device according to claim 1, an outer side of the duct wall having a substantially elliptical cross-sectional shape.

7. The teat cup device according to claim 1, the secondary ducts having substantially elliptical cross-sectional shapes.

8. The teat cup device according to claim 1, the secondary ducts having substantially elongated cross-sectional shapes, which elongated shapes extend substantially in a circumferential direction of the duct wall.

9. The teat cup device according to claim 1, wherein the duct wall is substantially smooth.

10. The teat cup device according to claim 1, wherein the main duct is configured to convey milk, and wherein the secondary ducts are configured to apply a vacuum.

11. The teat cup device according to claim 1, wherein the teat cup device is configured to be implemented in a milking installation.

12. The teat cup device according to claim 11, wherein the milking installation is an automatic milking installation comprising a robot device, and wherein the milk tube is coextensive with at least part of a robot arm of the robot device.

13. An automatic milking installation comprising at least one teat cup device and a robot device comprising a robot arm that is configured to automatically connect teat cups to udder quarters of a dairy animal,
- the teat cup comprising a teat cup and a flexible milk tube, the flexible milk tube being connected to the teat cup for discharging milk from the teat cup and applying a vacuum in the teat cup, the flexible milk tube comprising:
- a main duct defined by a duct wall,
- a plurality of secondary ducts located within the duct wall of the main duct, wherein the secondary ducts are separated from the main duct by the duct wall, and
- wherein the main and secondary ducts extend in the axial direction for substantially the entire length of the flexible milk tube, and
- wherein the secondary ducts are laterally offset relative to each other in a radial direction and overlap each other at least partially in a circumferential direction of the main duct.

14. The automatic milking installation of claim 13, wherein the milk tube is coextensive with at least part of a robot arm of the robot device.

15. The automatic milking installation of claim 13, wherein the installation comprises at least four teat cup devices.

* * * * *